April 28, 1959  D. B. PERLIS  2,884,090
ROLLING WEAR BAND FOR FILTER ELEMENT
Filed Aug. 8, 1955

DAVID B. PERLIS,
INVENTOR.

BY Knight & Rodgers

ATTORNEYS

United States Patent Office

2,884,090
Patented Apr. 28, 1959

2,884,090

ROLLING WEAR BAND FOR FILTER ELEMENT

David B. Perlis, Sun Valley, Calif., assignor to Western Precipitation Corporation, Los Angeles, Calif., a corporation of California Application August 8, 1955, Serial No. 526,870

7 Claims. (Cl. 183—61)

The present invention relates generally to filters of the type used for removing particles of dust and similar materials suspended in a gas stream, and more particularly to filters with a filter element provided with means for cleaning the element of accumulated dust particles by a jet of air blown through the filter element in a reverse direction. As an example, reference may be made to Patent Number 2,495,635, issued January 24, 1950, to Henry J. Hersey, Jr. on "Dust Filter" for further details of filters of this character employing tubular filters.

Filters of this type have one or more tubular filter elements, each element being made from a sheet of felt or woven fabric. Two opposite longitudinal margins of the original sheet are overlapped and sewn together in order to form the tubular element which is thus open at two ends with the seam extending longitudinally of the filter element. This seam is ordinarily sewn with thread in a conventional manner.

Filter elements of this type are provided with means for removing accumulated dust particles by directing a jet of cleaning air through the filter element. The cleaning member engages a narrow annular area on the external surface of the filter element and is moved longitudinally of the filter element in order to clean the entire area used for filtering purposes. The relative movement of the cleaning member and the filter element produces a certain amount of wear on the external surface of the filter element. This wear is particularly great at the seam because the seam is less flexible than the other portions, being of double thickness. However, the wear, in addition to being more concentrated in the area of the seam, is more detrimental at this point, because the cleaning member moving longitudinally of the filter element abrades the exposed portions of the threads used in closing the seam. When these threads are worn away sufficiently they break, allowing the filter element to open along the seam.

It is thus a general object of my invention to provide filters of this type with suitable anti-wear or anti-friction means adapted to eliminate friction in localized areas between the filter element and the movable cleaning member.

It is also an object of my invention to provide a filter of this character with suitable means for preventing wear and abrasion at the seam, and particularly on the threads of the seam, as a result of the movement of the cleaning member over the surface of the filter element.

These and other objects of my invention have been attained by providing a filter, comprising a filter element having a longitudinally extending seam and a filter cleaning element movable longitudinally of the seam, with anti-wear means interposed between the cleaning member and the filter element. In a preferred form of my invention, the anti-wear means consists of an endless band of a flexible character, preferably made of rubber or similar material. The flexible band encircles the cleaning ring and the inner surface of the band slides over the outer surface of the ring. The outer surface of the band engages the seam on the filter element and has in effect a rolling contact therewith so that there is no sliding movement of the band relative to the seam. In this manner abrasion at the seam, and especially of the thread at the seam, is substantially eliminated.

Figure 1:
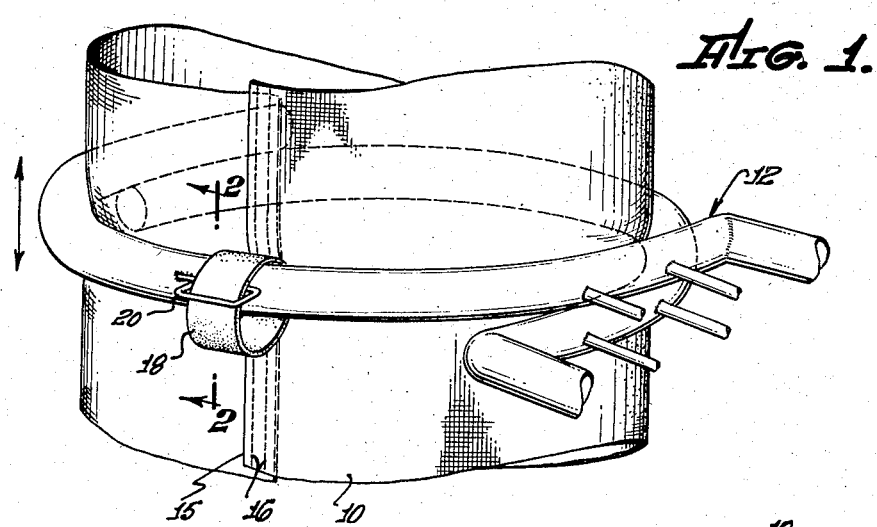
Fig. 1 is a perspective view of a short length of a tubular filter element surrounded by a cleaning member showing the anti-wear band mounted on the cleaning member and passing between the cleaning member and the seam on the filter element.

Referring now to the drawing, there is shown in Fig. 1 a short length of a tubular filter element 10 which is normally arranged with its axis vertical. In ordinary practice, the filter element is made of a suitable woven or felted material. The element is usually several feet high and is provided at its upper and lower ends with means for supporting the tube or filter element, there being provided at one end, usually the upper end, means for introducing into the interior of the filter element a stream of air or other gas carrying in suspension the particles to be collected. Collected particles are removed from the lower end of the filter element. These elements of a complete filter are not shown in the present drawings as they are not part of this invention, but reference may be had to the above mentioned Hersey patent for a disclosure of these portions of a filter structure.

Figure 2:
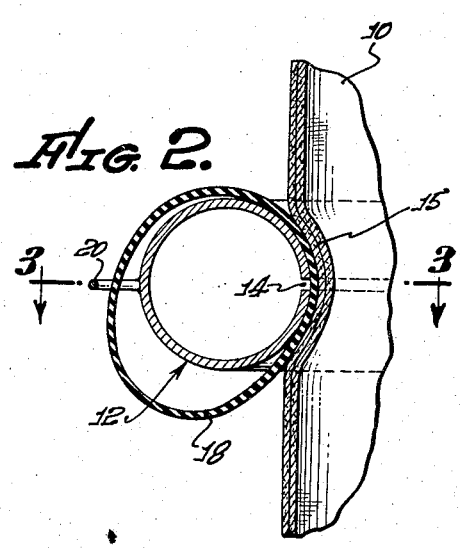
Fig. 2 is a fragmentary vertical section on line 2—2 of Fig. 3.
Figure 3:
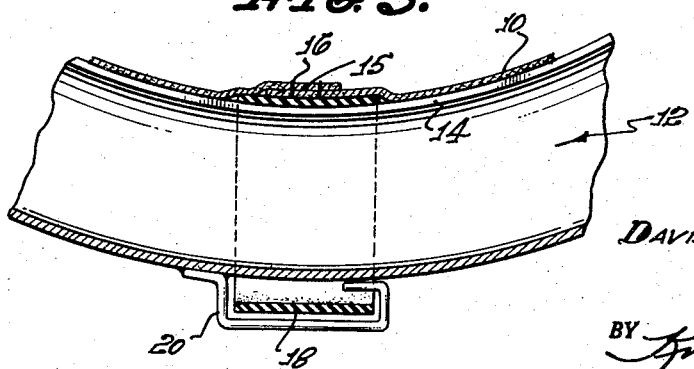
Fig. 3 is a fragmentary horizontal section on line 3—3 of Fig. 2.

In order to keep the filter element clean and in continuous operation, collected particles of dust and the like which have accumulated on the interior surface of the filter element are removed from the surface by a filter cleaning member indicated generally at 12. The cleaning member 12 is a ring-like member made in two halves which together completely surround tubular element 10 and are capable of limited movement in a horizontal direction relative to each other in order to better adjust the cleaning member to changes in diameter of the filter element. These two sections of the cleaning member 12 are mounted upon a carriage structure, not shown in the drawing, by which the cleaning element 12 is reciprocated up and down the full length of the filter element 10, continuous engagement being maintained between the outer surface of the filter element and the inside face of the cleaning member, as shown in Figs. 2 and 3. The cleaning ring is typically circular in transverse cross-section. The particular design of the cleaning ring 12 here shown and a suitable carriage construction for moving it longitudinally along the filter element are described in greater detail and also claimed in my co-pending application Serial No. 511,380 filed May 26, 1955, jointly with Norman M. McGrane on "Cleaning Air Ring for Cylindrical Filter Element," now Patent No. 2,818,136.

Each section of the cleaning member 12 has a slot 14 which extends around approximately 180° of the circumference of the filter element, the slot lying in a plane which is substantially perpendicular both to the axis of the filter element and the direction of travel of the cleaning member. The two slots lie in spaced, parallel planes. A suitable source of air under pressure is connected to each half of the cleaning member. The source of compressed air and the connections to the ring are not shown in this application since they form no part of the present invention. The air under pressure leaves through orifice 14 and passes through the filter element in a reverse direction to the movement of the main air stream; that is the cleaning air moves from the outside towards the inside and in so doing dislodges accumulated particles of dust from the inside surface of the tubular filter element. They then fall downwardly out of the filter element.

As is shown particularly in Fig. 2, the cleaning ring preferably indents the tubular element to maintain at all times a firm engagement between the filter element and the cleaning ring. This engagement provides an adequate seal at both sides of orifice 14 to prevent the escape of air laterally from the orifice. This engagement of the cleaning ring and the filter element also causes a substantial amount of wear on the threads 16 of the seam as the longitudinally moving cleaning member slides along the exterior surface of the filter element 10. This wear is particularly pronounced at seam 15 because the filter element yields less readily here where the wall is comprised of two overlapping thicknesses of material. The two overlapping layers are normally sewn together by threads 16 which have portions throughout their length exposed on the outside surface of the filter element. On this outside surface the threads 16 are abraded by the sliding movement of the cleaning ring; and it is only a question of time until they are sufficiently worn that they break, allowing the seam to open at the break.

It is to prevent this abrasion of the threads and to give a long life to the seam or joint 15 that I provide my novel anti-wear means. This means consists of an endless band 18 of flexible material, preferably of uniform thickness. The band 18 may be a short length of rubber tubing or similar material, having a diameter somewhat larger than the diameter of cleaning ring 12 in order that the flexible band can turn around the cleaning ring freely. Anti-wear band 18 encircles the cleaning ring at the location of seam 15 so that the band is interposed between the inside face of the cleaning ring and the outside surface of the filter element at the location of seam 15.

As the cleaning member 12 moves up and down longitudinally of the filter element 10, the anti-wear band is moved into and out of contact with the surface of the filter element without any slipping or sliding of the band relative to the filter element. This may be described as a rolling contact with the filter element as it is very similar to a wheel being rolled over the surface of the filter element. On the other hand, the band slides over the smooth convex surface of the cleaning member, being free to turn around the cleaning ring. Cleaning member 12 is normally made of metal, as for example brass, which has a polished surface in the zone of contact. On the other hand there is a relatively high coefficient of friction between the outer surface of band 18 and filter element 10 which facilitates holding the wear band so that there is no sliding movement between it and the filter at the area of contact.

Although in a preferred form, band 18 is an endless member of a diameter no larger than perhaps twice the diameter of ring 12, it will be understood that my invention is not limited to any particular diameter for the rolling band. It will be seen that it is within the scope of my invention to increase the diameter of band 18 to any desired value. A band of a diameter as shown in the drawing has the advantage of being relatively small and easy to handle and any point on it will come into contact with the filter element several times throughout the length of travel from the top to bottom of the filter element.

The width of band 18 is preferably only slightly greater than the width of seam 15, as shown in Fig. 3. This is done in order not to block off any more of orifice 14 than is necessary. In order to hold the anti-wear band against shifting along ring 12 and thereby becoming displaced from a position in which it travels along seam 16, I prefer to attach to the cleaning member some means for restraining the band against shifting along the cleaning ring. This may take the form of a wire loop or guide 20 which is attached at one end to the outer surface of cleaning ring 12, as shown in Fig. 3 particularly. By engagement with the end surfaces of band 18, the radially extending portions of guide 20 hold the rolling band in place to maintain it in contact with seam 15.

From the foregoing description it will be seen that various changes in the exact design and arrangement of the novel anti-friction means constituting my invention may occur to persons skilled in the art without departing from the spirit and scope of my invention. Accordingly, it is to be understood that the foregoing description is considered as being illustrative of, rather than limitative upon, the appended claims.

I claim:

1. The combination with a tubular filter element having a longitudinally extending seam and a reverse-jet cleaning ring of circular cross-section surrounding and in perimetral contact with and serving to constrict said filter element in such zone of contact and movable longitudinally of the filter element, of anti-wear means carried by said cleaning ring for eliminating friction between the ring and the seam and comprising a member interposed between the ring and the seam and movable relative to the ring.

2. The combination as in claim 1 in which the anti-wear means is an endless flexible band encircling the ring and engaging the seam on the filter element, the band being free to turn around the cleaning ring.

3. The combination as in claim 2 which also includes means on the ring restraining the band against shifting circumferentially of the ring.

4. The combination with a filter element and a relatively movable cleaning member engaging a surface of the filter element for cleaning the filter element, of a rolling anti-wear band interposed between a portion of the filter element and the cleaning member to engage said element and said member at opposite sides of the band and movable relative to the cleaning member and in rolling engagement with the filter element.

5. The combination as in claim 4 in which the anti-wear band is made of a relatively soft, flexible material and is frictionally held between the cleaning member and the filter member.

6. The combination as in claim 4 in which the length of the cleaning element in engagement with the anti-wear band is only a small fraction of the entire length of the cleaning element.

7. The combination with a filter element having a longitudinally extending seam and a filter element cleaning member movable in engagement with the filter element in a direction parallel to the seam, of an endless anti-wear band encircling the cleaning member and passing between and in engagement with the cleaning member and the filter element at the seam, the anti-wear band being frictionally held by the filter element to effect rolling engagement with the seam and eliminate rubbing contact of the cleaning element with the seam.

References Cited in the file of this patent

UNITED STATES PATENTS

| | | |
|---|---|---|
| 360,130 | Whitehill | Mar. 29, 1887 |
| 2,026,834 | Holly | Jan. 7, 1936 |
| 2,306,664 | Scott-Paine | Dec. 29, 1942 |
| 2,362,008 | Hile | Nov. 7, 1944 |
| 2,584,746 | Sheldon | Feb. 5, 1952 |

FOREIGN PATENTS

| | | |
|---|---|---|
| 772,047 | France | Aug. 6, 1934 |